US009727186B2

(12) United States Patent
Yang

(10) Patent No.: US 9,727,186 B2
(45) Date of Patent: Aug. 8, 2017

(54) PIXEL CIRCUIT, DRIVING METHODS THEREOF, ORGANIC LIGHT EMITTING DIODE DISPLAY PANEL, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Shengji Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 14/650,801

(22) PCT Filed: Aug. 25, 2014

(86) PCT No.: PCT/CN2014/085104
§ 371 (c)(1),
(2) Date: Jun. 9, 2015

(87) PCT Pub. No.: WO2015/196553
PCT Pub. Date: Dec. 30, 2015

(65) Prior Publication Data
US 2016/0246409 A1 Aug. 25, 2016

(30) Foreign Application Priority Data
Jun. 27, 2014 (CN) .......................... 2014 1 0302711

(51) Int. Cl.
G09G 3/30 (2006.01)
G06F 3/041 (2006.01)
(Continued)

(52) U.S. Cl.
CPC ............ *G06F 3/044* (2013.01); *G06F 3/0412* (2013.01); *G06F 3/0416* (2013.01);
(Continued)

(58) Field of Classification Search
CPC ...... G09G 3/32; G09G 3/3225; G09G 3/3233; G06F 3/0412; G06F 3/416; G06F 3/044
See application file for complete search history.

(56) References Cited

U.S. PATENT DOCUMENTS

2010/0097352 A1* 4/2010 Ahn ....................... G06F 3/0412
345/175
2011/0063252 A1 3/2011 Chang et al.
(Continued)

FOREIGN PATENT DOCUMENTS

CA 2824621 A1 2/2014
CN 101957695 A 1/2011
(Continued)

OTHER PUBLICATIONS

First Office Action regarding Chinese application No. 201410302711.4, dated Sep. 30, 2015. Translation provided by Dragon Intellectual Property Law Firm.
(Continued)

Primary Examiner — Kwang-Su Yang
(74) Attorney, Agent, or Firm — Harness, Dickey & Pierce, P.L.C.

(57) ABSTRACT

The present disclosure provides a pixel circuit, its driving methods, an OLED display panel and a display device. The pixel circuit includes a driving controlling unit configured to, under the control of a first scanning signal and a second scanning signal, charge or discharge a first storage capacitor through a first level, a second level and a data voltage, so as to compensate for a threshold voltage of a driving transistor with a gate-to-source voltage of the driving transistor when
(Continued)

an OLED is driven by the driving transistor to emit light; and a touch controlling unit including a touch sensor and configured to, under the control of the first scanning signal and the second scanning signal, sense by the touch sensor whether or not a touch is made and transmit a corresponding touch sensing signal to a touch signal reading line.

15 Claims, 13 Drawing Sheets

(51) Int. Cl.
*G06F 3/042* (2006.01)
*G06F 3/044* (2006.01)
*G09G 3/3225* (2016.01)
*G09G 3/3233* (2016.01)

(52) U.S. Cl.
CPC ......... *G09G 3/3225* (2013.01); *G09G 3/3233* (2013.01); *G09G 2300/0819* (2013.01); *G09G 2300/0852* (2013.01); *G09G 2300/0861* (2013.01); *G09G 2310/0251* (2013.01); *G09G 2310/0262* (2013.01); *G09G 2320/043* (2013.01); *G09G 2354/00* (2013.01)

(56) References Cited

U.S. PATENT DOCUMENTS

| | | | |
|---|---|---|---|
| 2011/0102403 A1* | 5/2011 | Kim | G09G 3/3233 345/211 |
| 2013/0082910 A1 | 4/2013 | Lee | |
| 2014/0055500 A1 | 2/2014 | Lai | |
| 2014/0198067 A1* | 7/2014 | Jeon | G06F 3/0416 345/173 |
| 2014/0225938 A1* | 8/2014 | Soni | G09G 3/3233 345/690 |
| 2015/0193045 A1 | 7/2015 | Zhou et al. | |
| 2015/0294626 A1 | 10/2015 | Bi et al. | |
| 2016/0246409 A1 | 8/2016 | Yang | |

FOREIGN PATENT DOCUMENTS

| | | |
|---|---|---|
| CN | 102682705 A | 9/2012 |
| CN | 103135846 A | 6/2013 |
| CN | 103137067 A | 6/2013 |
| CN | 103208255 A | 7/2013 |
| CN | 103246396 A | 8/2013 |
| CN | 103295525 A | 9/2013 |
| CN | 203179480 U | 9/2013 |
| CN | 203242307 U | 10/2013 |
| CN | 103456267 A | 12/2013 |
| CN | 203503280 U | 3/2014 |
| CN | 104021756 A | 9/2014 |
| CN | 203858846 U | 10/2014 |
| JP | 2006119180 A | 5/2006 |
| JP | 2006285117 A | 10/2006 |
| JP | 2012123399 A | 6/2012 |
| WO | WO-2011028451 A1 | 3/2011 |

OTHER PUBLICATIONS

Written Opinion of the International Searching Authority for international application No. PCT/CN2014/085104.
Written Opinion of the International Searching Authority for International Application No. PCT/CN2014/087789. Translation provided by Dragon Intellectual Property Law Firm.

* cited by examiner

US 9,727,186 B2

PIXEL CIRCUIT, DRIVING METHODS THEREOF, ORGANIC LIGHT EMITTING DIODE DISPLAY PANEL, AND DISPLAY DEVICE

CROSS-REFERENCE TO RELATED APPLICATION

The present application is the U.S. national phase of PCT Application No. PCT/CN2014/085104 filed on Aug. 25, 2014, which claims a priority of the Chinese patent application No. 201410302711.4 filed on Jun. 27, 2014, which is incorporated herein by reference in its entirety.

TECHNICAL FIELD

The present disclosure relates to the field of display technology, in particular to a pixel circuit, its driving methods, an organic light-emitting diode (OLED) display panel, and a display device.

BACKGROUND

Active matrix/organic light-emitting diode (AMOLED) display is one of the research hotpots for a current flat-panel display device. The OLED has such advantages as low power consumption, low production cost, self-luminescence, wide viewing angle and rapid response. The design of a pixel driving circuit is a core of the AMOLED display, and thus it is of important research significance.

For the AMOLED display, it is required to provide a stable current to control the OLED to emit light. Due to the manufacturing process and the aging of devices, a threshold voltage (Vth) of a driving TFT for each pixel point will be drifted, which results in a change of the current passing through the OLED for each pixel point along with a change of the threshold voltage. As a result, the display brightness is uneven, and thereby a display effect of an entire image will be adversely affected.

Currently, an in-cell touch technology has been applied to a liquid crystal display (LCD). As the most difficult problem to be solved in the in-cell touch technology, there is signal interference, i.e., there is a considerable parasitic capacitance between a touch electrode and an electrode desired for the operation of the LCD. As a result, it is very difficult to prevent display characteristics of the LCD itself from being adversely affected while ensuring that a touch signal is collected successfully. Hence, a combination of the in-cell touch technology with the AMOLED will be a future trend of the display technology.

SUMMARY

A main object of the present disclosure is to provide a pixel circuit, its driving methods, an OLED display panel and a display device, so as to eliminate an effect caused by a threshold voltage of a driving transistor on a light-emitting driving signal, thereby to improve the brightness evenness of the OLED display panel as well as a display effect of the display device. In addition, it is also able to detect a touch while achieving the display driving, thereby to further achieve integration of the display driving and the touch detection in a more effective manner.

In one aspect, the present disclosure provides in one embodiment a pixel circuit, including a driving transistor, a first storage capacitor, and an OLED. A gate electrode of the driving transistor is connected to a first end of the first storage capacitor, a first electrode of the driving transistor is connected to an anode of the OLED, and a cathode of the OLED is configured to receive a first level. The pixel circuit further includes:

a driving controlling unit connected to the first end of the first storage capacitor, a second end of the first storage capacitor, the first electrode of the driving transistor and a second electrode of the driving transistor, and configured to, under the control of a first scanning signal and a second scanning signal, charge or discharge the first storage capacitor through the first level, a second level and a data voltage, so as to compensate for a threshold voltage of the driving transistor with a gate-to-source voltage of the driving transistor when the OLED is driven by the driving transistor to emit light; and a touch controlling unit connected to the second end of the first storage capacitor and a touch signal reading line, and including a touch sensor and configured to, under the control of the first scanning signal and the second scanning signal, sense by the touch sensor whether or not a touch is made and transmit a corresponding touch sensing signal to the touch signal reading line.

During the implementation, the driving controlling unit includes:

a first driving controlling transistor, a gate electrode of which is configured to receive the second scanning signal, a first electrode of which is connected to the second electrode of the driving transistor, and a second electrode of which is configured to receive the second level;

a second driving controlling transistor, a gate electrode of which is configured to receive the first scanning signal, a first electrode of which is connected to the first end of the first storage capacitor, and a second electrode of which is connected to the second electrode of the driving transistor;

a third driving controlling transistor, a gate electrode of which is configured to receive a control signal, a first electrode of which is connected to the second end of the first storage capacitor, and a second electrode of which is connected to the data voltage, the control signal being of a phase inverted to that of the second scanning signal; and a fourth driving controlling transistor, a gate electrode of which is configured to receive the first scanning signal, a first electrode of which is configured to receive the first level, and a second electrode of which is connected to the first electrode of the driving transistor.

The first driving controlling transistor is of a type identical to the third driving controlling transistor, and the second driving controlling transistor is of a type identical to the fourth driving controlling transistor.

During the implementation, the driving controlling unit includes:

a first driving controlling transistor, a gate electrode of which is configured to receive the second scanning signal, a first electrode of which is connected to the second electrode of the driving transistor, and a second electrode of which is configured to receive the second level;

a second driving controlling transistor, a gate electrode of which is configured to receive the first scanning signal, a first electrode of which is connected to the first end of the first storage capacitor, and a second electrode of which is connected to the second electrode of the driving transistor;

a third driving controlling transistor, a gate electrode of which is connected to the second scanning signal, a first electrode of which is connected to the second end of the first storage capacitor, and a second electrode of which is configured to receive the data voltage; and a fourth driving controlling transistor, a gate electrode of which is configured to receive the first scanning signal, a first electrode of which is configured to receive the first level, and a second electrode of which is connected to the first electrode of the driving transistor.

The first driving controlling transistor is of a type different from the third driving controlling transistor, and the second driving controlling transistor is of a type identical to the fourth driving controlling transistor.

During the implementation, the touch sensor includes a touch electrode. The touch controlling unit is configured to convert a potential of the touch electrode into the touch sensing signal, and transmit the touch sensing signal to the touch signal reading line.

During the implementation, the touch controlling unit includes:

a second storage capacitor;

a first touch controlling transistor, a gate electrode of which is configured to receive the first scanning signal, a first electrode of which is connected to a touch electrode end of the second storage capacitor, and a second electrode of which is connected to the second end of the first storage capacitor;

a second touch controlling transistor, a gate electrode of which is connected to the touch electrode end of the second storage capacitor, and a first electrode of which is configured to receive a third level; and a third touch controlling transistor, a gate electrode of which is configured to receive the second scanning signal, a first electrode of which is connected to a second electrode of the second touch controlling transistor, and a second electrode of which is connected to the touch signal reading line.

The other end of the second storage capacitor is configured to receive the third level. The third touch controlling transistor is of a type identical to the first driving controlling transistor, and the first touch controlling transistor is of a type identical to the second driving controlling transistor.

During the implementation, the touch sensor includes a photosensitive transistor, and the touch controlling unit is configured to convert a photocurrent signal generated by the photosensitive transistor into the touch sensing signal, and transmit the touch sensing signal to the touch signal reading line.

During the implementation, the touch controlling unit includes:

a first touch controlling transistor, a gate electrode of which is configured to receive the first scanning signal, a first electrode of which is configured to receive the data voltage, and a second electrode of which is connected to a first electrode of the photosensitive transistor;

a second touch controlling transistor, a gate electrode of which is configured to receive the second scanning signal, a first electrode of which is connected to a second electrode of the photosensitive transistor, and a second electrode of which is connected to the touch signal reading line; and a second storage capacitor, a first electrode of which is connected to a gate electrode of the photosensitive transistor, and a second electrode of which is connected to the second electrode of the photosensitive transistor.

The gate electrode of the photosensitive transistor is connected to the first electrode of the photosensitive transistor. The second touch controlling transistor is of a type identical to the first driving controlling transistor, and the first touch controlling transistor is of a type identical to the second driving controlling transistor.

In another aspect, the present disclosure provides in one embodiment a method for driving the above-mentioned pixel circuit, including:

a display driving step: within a time period, under the control of a first scanning signal and a second scanning signal, enabling, by a driving controlling unit, a first storage capacitor to be charged or discharged through a first level, a second level and a data voltage, so as to compensate for a threshold voltage of a driving transistor with a gate-to-source voltage of the driving transistor when an OLED is driven by a driving transistor to emit light; and a touching step: within the time period, under the control of the first scanning signal and the second scanning signal, sensing, by a touch controlling unit, whether or not a touch is made through a touch sensor, and transmitting a corresponding touch sensing signal to a touch signal reading line.

During the implementation, the display driving step includes steps of:

at a first stage of the time period, under the control of the first scanning signal and the second scanning signal, controlling, by the driving controlling unit, a first end of the first storage capacitor to be charged to the second level;

at a second stage of the time period, under the control of the first scanning signal and the second scanning signal, controlling, by the driving controlling unit, a potential at a second end of the first storage capacitor to be a resetting voltage Vp, and controlling the first storage capacitor to be discharged, so as to decrease a potential at the first end of the first storage capacitor to the threshold voltage Vth of the driving transistor;

at a third stage of the time period, under the control of the second scanning signal, controlling, by the driving controlling unit, the first end of the first storage capacitor to be floating, controlling a potential at the second end of the first storage capacitor to jump to Vp+ΔVdata, so as to maintain the potential at the first end of the first storage capacitor at Vth+ΔVdata, ΔVdata being a variation of the data voltage; and at a fourth stage of the time period, under the control of the second scanning signal, controlling, by the driving controlling unit, a second electrode of the driving transistor to receive the second level, controlling the driving transistor to drive the OLED to emit light, and compensating for the threshold voltage of the driving transistor with the gate-to-source voltage of the driving transistor.

In yet another aspect, the present disclosure provides in one embodiment a method for driving the above-mentioned pixel circuit, including:

a display driving step:

at a first stage of a time period, under the control of a first scanning signal and a second scanning signal, controlling, by a driving controlling unit, a first end of a first storage capacitor to be charged to a second level;

at a second stage of the time period, under the control of the first scanning signal and the second scanning signal, controlling, by the driving controlling unit, a potential at a second end of the first storage capacitor to be a resetting voltage Vp, and controlling the first storage capacitor to be discharged, so as to decrease a potential at the first end of the first storage capacitor a threshold voltage Vth of a driving transistor;

at a third stage of the time period, under the control of the second scanning signal, driving, by the driving controlling unit, the first end of the first storage capacitor to be floating, and controlling the potential at the second end of the first storage capacitor to jump to Vp+ΔVdata, so as to maintain the potential at the first end of the first storage capacitor at Vth+ΔVdata, ΔVdata being a variation of a data voltage; and at a fourth stage of the time period, under the control of the second scanning signal, controlling, by the driving controlling unit, a second electrode of the driving transistor to receive the second level, controlling the driving transistor to drive an OLED to emit light, and compensating for the threshold voltage of the driving transistor with a gate-to-source voltage of the driving transistor, and a touching step:

at the second stage of the time period, resetting, by a touch controlling unit, a potential at a touch electrode end of a second storage capacitor to the resetting level Vp; and at the fourth stage of the time period, converting, by the touch controlling unit, the potential at the touch electrode end of the second storage capacitor into a current signal, and transmitting the current signal as a touch sensing signal to a touch signal reading line.

In still yet another aspect, the present disclosure provides in one embodiment a method for driving the above-mentioned pixel circuit, including:

a display driving step at a first stage of a time period, under the control of a first scanning signal and a second scanning signal, controlling, by a driving controlling unit, a first end of a first storage capacitor to be charged to a second level;

at a second stage of the time period, under the control of the first scanning signal and the second scanning signal, controlling, by the driving controlling unit, a potential at a second end of the first storage capacitor to be a resetting voltage Vp, and controlling the first storage capacitor to be discharged, so as to decrease a potential at the first end of the first storage capacitor to a threshold voltage Vth of a driving transistor;

at a third stage of the time period, under the control of the second scanning signal, controlling, by the driving controlling unit, the first end of the first storage capacitor to be floating, and controlling the potential at the second end of the first storage capacitor to jump to Vp+ΔVdata, so as to maintain the potential at the first end of the first storage capacitor at Vth+Vdata, ΔVdata being a variation of a data voltage; and at a fourth stage of the time period, under the control of the second scanning signal, controlling, by the driving controlling unit, a second electrode of the driving transistor to receive the second level, controlling the driving transistor to drive an OLED to emit light, and compensating for the threshold voltage of the driving transistor with a gate-to-source voltage of the driving transistor, and a touching step:

at the first stage of the time period, under the control of the first scanning signal and the second scanning signal, writing, by a touch controlling unit, the resetting level Vp into a touch signal reading line;

at the second stage of the time period, under the control of the first scanning signal and the second scanning signal, resetting, by the touch controlling unit, a potential at a first electrode of a photosensitive transistor to the resetting level Vp;

at the third stage of the time period, under the control of the second scanning signal, controlling, by the touch controlling unit, a second storage capacitor to be charged with a photocurrent signal generated by the photosensitive transistor as a charging current so as to increase a potential at a second end of the second storage capacitor; and at the fourth stage of the time period, under the control of the second scanning signal, converting, by the touch controlling unit, the potential at the second end of the second storage capacitor into a current signal, and transmitting the current signal as a touch sensing signal to the touch signal reading line.

In still yet another aspect, the present disclosure provides in one embodiment an OLED display panel including the above-mentioned pixel circuit.

In still yet another aspect, the present disclosure provides in one embodiment a display device including the above-mentioned OLED display panel.

As compared with the related art, it is able for the pixel circuit, its driving methods, the OELD display panel and the display device in the embodiments of the present disclosure to eliminate an effect caused by the threshold voltage of the driving transistor on the light-emitting driving signal, thereby to improve the brightness evenness of the OLED display panel as well as a display effect of the display device. In addition, it is also able to achieve the touch control while achieving the display driving, thereby to further achieve integration of the display driving and the touch control in a more effective manner.

DETAILED DESCRIPTION

In order to make the objects, the technical solutions and the advantages of the present disclosure more apparent, the present disclosure will be described hereinafter in conjunction with the drawings and embodiments in a clear and complete manner. Obviously, the following embodiments merely relate to a part of, rather than all of, the embodiments of the present disclosure. Based on these embodiments, a person skilled in the art may obtain the other embodiments without any creative effort, which also fall within the scope of the present disclosure.

Figure 1:
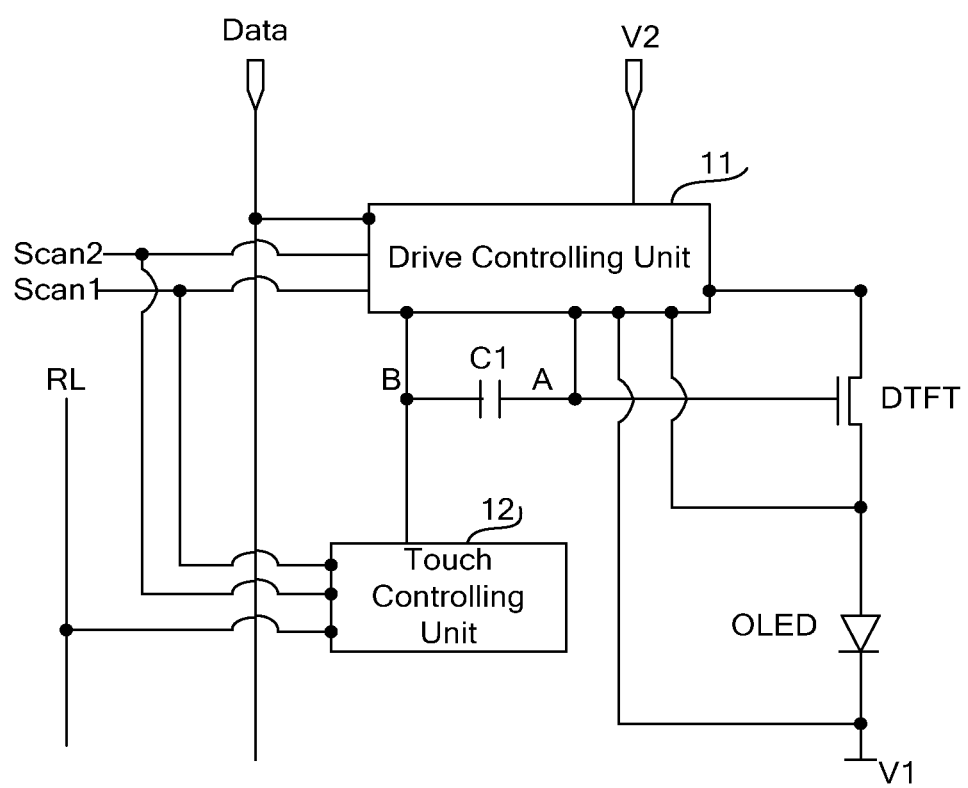
FIG. 1 is a schematic view showing a pixel circuit according to one embodiment of the present disclosure.

As shown in FIG. 1, a pixel circuit in one embodiment of the present disclosure includes a driving transistor DTFT, a first storage capacitor C1 and an OLED. A gate electrode of the driving transistor DTFT is connected to a first end of the first storage capacitor C1, a first electrode thereof is connected to an anode of the OLED, and a cathode of the OLED is configured to receive a first level V1. The pixel circuit further includes:

a driving controlling unit 11 connected to the first end (end A) of the first storage capacitor C1, a second end (end B) of the first storage capacitor C1, the first electrode of the driving transistor DTFT and a second electrode of the driving transistor DTFT, and configured to, under the control of a first scanning signal Scan1 and a second scanning signal Scan2, charge or discharge the first storage capacitor C1 through the first level V1, a second level V2 and a data voltage Vdata, so as to compensate for a threshold voltage of the driving transistor DTFT with a gate-to-source voltage of the driving transistor DTFT when the OLED is driven by the driving transistor DTFT to emit light; and a touch controlling unit 12 connected to the second end of the first storage capacitor C1 and a touch signal reading line RL, and configured to, under the control of the first scanning signal Scan1 and the second scanning signal Scan2, sense by a touch sensor (not shown) whether or not a touch is made and transmit a corresponding touch sensing signal to the touch signal reading line RL.

According to the pixel circuit in the embodiment of the present disclosure, it is able to eliminate an effect caused by the threshold voltage of the driving transistor on the light-emitting driving signal, thereby to improve the brightness evenness of the OLED display panel as well as a display effect of the display device. In addition, it is also able to achieve the touch control while achieving the display driving, thereby to further achieve integration of the display driving and the touch control in a more effective manner.

In addition, the first scanning signal, the second scanning signal and the data voltage are multiplexed by the driving controlling unit 11 and the touch controlling unit 12 of the pixel circuit, so it is able to achieve integration of a display function and a touch function of the AMOLED in a more effective manner through three signal lines.

To be specific, the driving controlling unit includes:

a first driving controlling transistor, a gate electrode of which is configured to receive the second scanning signal, a first electrode of which is connected to the second electrode of the driving transistor, and a second electrode of which is configured to receive the second level;

a second driving controlling transistor, a gate electrode of which is configured to receive the first scanning signal, a first electrode of which is connected to the first end of the first storage capacitor, and a second electrode of which is connected to the second electrode of the driving transistor;

a third driving controlling transistor, a gate electrode of which is configured to receive a control signal, a first electrode of which is connected to the second end of the first storage capacitor, and a second electrode of which is connected to the data voltage, the control signal being of a phase inverted to that of the second scanning signal; and a fourth driving controlling transistor, a gate electrode of which is configured to receive the first scanning signal, a first electrode of which is configured to receive the first level, and a second electrode of which is connected to the first electrode of the driving transistor.

The first driving controlling transistor is of a type identical to the third driving controlling transistor, and the second driving controlling transistor is of a type identical to the fourth driving controlling transistor.

Alternatively, the driving controlling unit includes:

a first driving controlling transistor, a gate electrode of which is configured to receive the second scanning signal, a first electrode of which is connected to the second electrode of the driving transistor, and a second electrode of which is configured to receive the second level;

a second driving controlling transistor, a gate electrode of which is configured to receive the first scanning signal, a first electrode of which is connected to the first end of the first storage capacitor, and a second electrode of which is connected to the second electrode of the driving transistor;

a third driving controlling transistor, a gate electrode of which is connected to the second scanning signal, a first electrode of which is connected to the second end of the first storage capacitor, and a second electrode of which is configured to receive the data voltage; and a fourth driving controlling transistor, a gate electrode of which is configured to receive the first scanning signal, a first electrode of which is configured to receive the first level, and a second electrode of which is connected to the first electrode of the driving transistor.

The first driving controlling transistor is of a type different from the third driving controlling transistor, and the second driving controlling transistor is of a type identical to the fourth driving controlling transistor.

To be specific, the pixel circuit in the embodiments of the present disclosure may be applied to a capacitive in-cell touch display panel. The touch sensor includes a touch electrode, and the touch controlling unit is configured to convert a potential of the touch electrode into the touch sensing signal, and transmit the touch sensing signal to the touch signal reading line.

To be specific, the touch controlling unit includes:

a second storage capacitor;

a first touch controlling transistor, a gate electrode of which is configured to receive the first scanning signal, a first electrode of which is connected to a touch electrode end of the second storage capacitor, and a second electrode of which is connected to the second end of the first storage capacitor;

a second touch controlling transistor, a gate electrode of which is connected to the touch electrode end of the second storage capacitor, and a first electrode of which is configured to receive a third level; and a third touch controlling transistor, a gate electrode of which is configured to receive the second scanning signal, a first electrode of which is connected to a second electrode of the second touch controlling transistor, and a second electrode of which is connected to the touch signal reading line.

The other end of the second storage capacitor is configured to receive the third level. The third touch controlling transistor is of a type identical to the first driving controlling transistor, and the first touch controlling transistor is of a type identical to the second driving controlling transistor.

The present disclosure further provides in one embodiment a method for driving the above-mentioned pixel circuit, including:

a display driving step: within a time period, under the control of a first scanning signal and a second scanning signal, enabling, by a driving controlling unit, a first storage capacitor to be charged or discharged through a first level, a second level and a data voltage, so as to compensate for a threshold voltage of a driving transistor with a gate-to-source voltage of the driving transistor when an OLED is driven by a driving transistor to emit light; and a touching step: within the time period, under the control of the first scanning signal and the second scanning signal, sensing, by a touch controlling unit, whether or not a touch is made through a touch sensor, and transmitting a corresponding touch sensing signal to a touch signal reading line.

To be specific, the display driving step includes steps of:

at a first stage of the time period, under the control of the first scanning signal and the second scanning signal, controlling, by the driving controlling unit, a first end of the first storage capacitor to be charged to the second level;

at a second stage of the time period, under the control of the first scanning signal and the second scanning signal, controlling, by the driving controlling unit, a potential at a second end of the first storage capacitor to be a resetting voltage Vp, and controlling the first storage capacitor to be discharged, so as to decrease a potential at the first end of the first storage capacitor to the threshold voltage Vth of the driving transistor;

at a third stage of the time period, under the control of the second scanning signal, controlling, by the driving controlling unit, the first end of the first storage capacitor to be floating, controlling a potential at the second end of the first storage capacitor to jump to Vp+ΔVdata, so as to maintain the potential at the first end of the first storage capacitor at Vth+ΔVdata, ΔVdata being a variation of the data voltage; and at a fourth stage of the time period, under the control of the second scanning signal, controlling, by the driving controlling unit, a second electrode of the driving transistor to receive the second level, controlling the driving transistor to drive the OLED to emit light, and compensating for the threshold voltage of the driving transistor with the gate-to-source voltage of the driving transistor.

Figure 2:
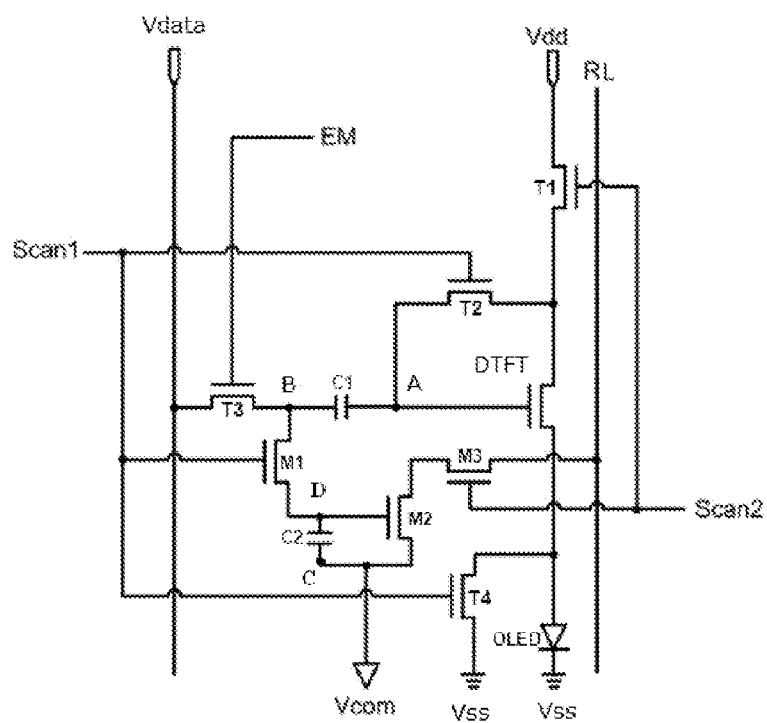
FIG. 2 is a circuit diagram of the pixel circuit according to one embodiment of the present disclosure.

As shown in FIG. 2, the cathode of the OLED is configured to receive a first low level Vss. The driving controlling unit includes:

a first driving controlling transistor T1, a gate electrode of which is configured to receive the second scanning signal Scan2, a first electrode of which is connected to the second electrode of the driving transistor DTFT, and a second electrode of which is configured to receive a high level Vdd;

a second driving controlling transistor T2, a gate electrode of which is configured to receive the first scanning signal Scan1, a first electrode of which is connected to the first end of the first storage capacitor C1, and a second electrode of which is connected to the second end of the driving transistor DTFT;

a third driving controlling transistor T3, a gate electrode of which is configured to receive a control signal EM, a first electrode of which is connected to the second end of the first storage capacitor C1, and a second electrode of which is configured to receive the data voltage Vdata, the control signal EM being of a phase inverted to that of the second scanning signal Scan2; and a fourth driving controlling transistor T4, a gate electrode of which is configured to receive the first scanning signal Scan1, a first electrode is configured to receive the first low level Vss, and a second electrode of which is connected to the first electrode of the driving transistor DTFT.

In the embodiment, DTFT, T1, T2, T3 and T4 are all N-type thin film transistors (TFTs), and the pixel design adopts a 5T1C-based compensating structure. As a result, it is able to use the same process for manufacturing a metal-oxide-semiconductor (MOS) field-effect transistor (FET), and to improve the product yield.

The touch controlling unit includes:

a second storage capacitor C2;

a first touch controlling transistor M1, a gate electrode of which is configured to receive the first scanning signal Scan1, a first electrode of which is connected to a touch electrode end D of the second storage capacitor C2, and a second electrode of which is connected to the second end B of the first storage capacitor C1;

a second touch controlling transistor M2, a gate electrode of which is connected to the touch electrode end D of the second storage capacitor C2, and a first electrode of which is configured receive a second low level Vcom; and a third touch controlling transistor M3, a gate electrode of which is configured to receive the second scanning signal Scan2, a first electrode of which is connected to a second electrode of the second touch controlling transistor M2, and a second electrode of which is connected to the touch signal reading line RL.

The other end, i.e., end C, of the second storage capacitor C2 is configured to receive the second low level Vcom.

In the pixel circuit according to the embodiment of the present disclosure, M1, M2 and M3 are all N-type TFTs. M1 is a signal-resetting TFT, M2 functions as to amplify the current signal, M3 is a switching TFT, T1, T2, T3 and T4 are switching TFTs, and DTFT is a driving TFT.

A coordinate of a position where a touch is made is determined through a second scanning line outputting the second scanning signal Scan2 and the touch signal reading line RL. In other words, an X-axis coordinate is determined through the second scanning line, and a Y-axis coordinate is determined through the touch signal reading line RL.

Figure 3:
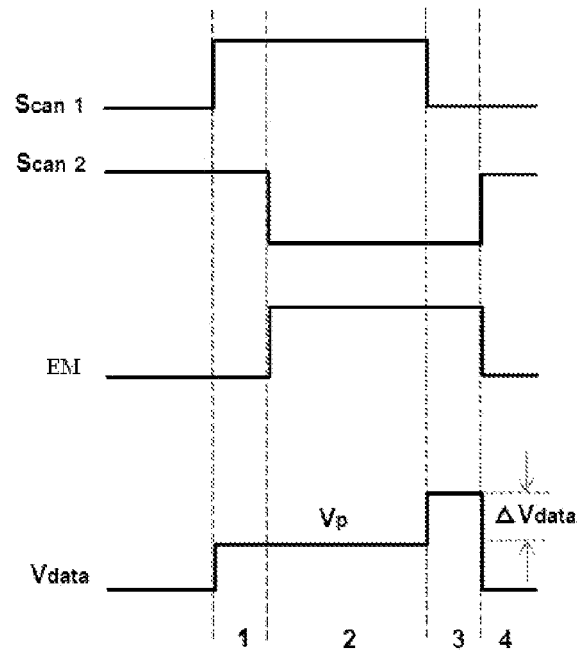
FIG. 3 is a sequence diagram of a first scanning signal Scan1, a second scanning signal Scan2, a control signal EM and a data voltage Vdata for the pixel circuit in FIG. 2.

FIG. 3 is a sequence diagram of the first scanning signal Scan1, the second scanning signal Scan2, the control signal EM and the data voltage Vdata for the pixel circuit in FIG. 2.

Figure 4A:
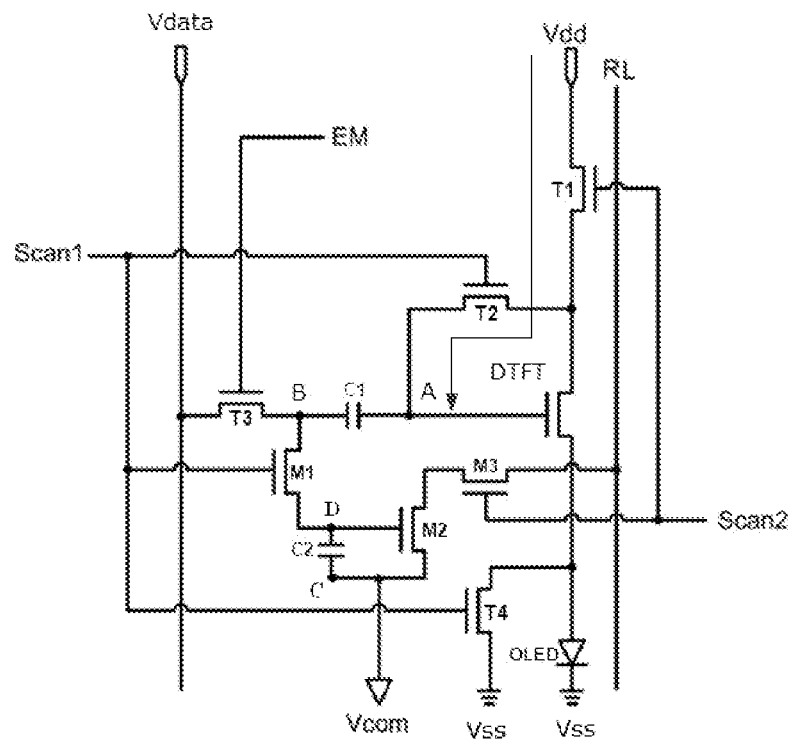
FIGS. 4A, 4B, 4C and 4D are schematic views showing the pixel circuit in FIG. 2 at a first stage, a second stage, a third stage and a fourth stage, respectively.

During the operation of the pixel circuit in FIG. 2, at the first stage of the time period, Scan1 and Scan2 are both at a high level, EM is at a low level, Vdata is at the resetting level Vp, T1, T2 and T4 are turned on, and T3 is turned off. As shown in FIG. 4A, the end A is charged to Vdd. M1 and M3 are turned on, the first electrode of M2 is configured to receive the second low level Vcom. At this time, a condition for turning on and amplifying the TFT is satisfied, and RL receives an initial reference amplification signal.

Figure 4B:
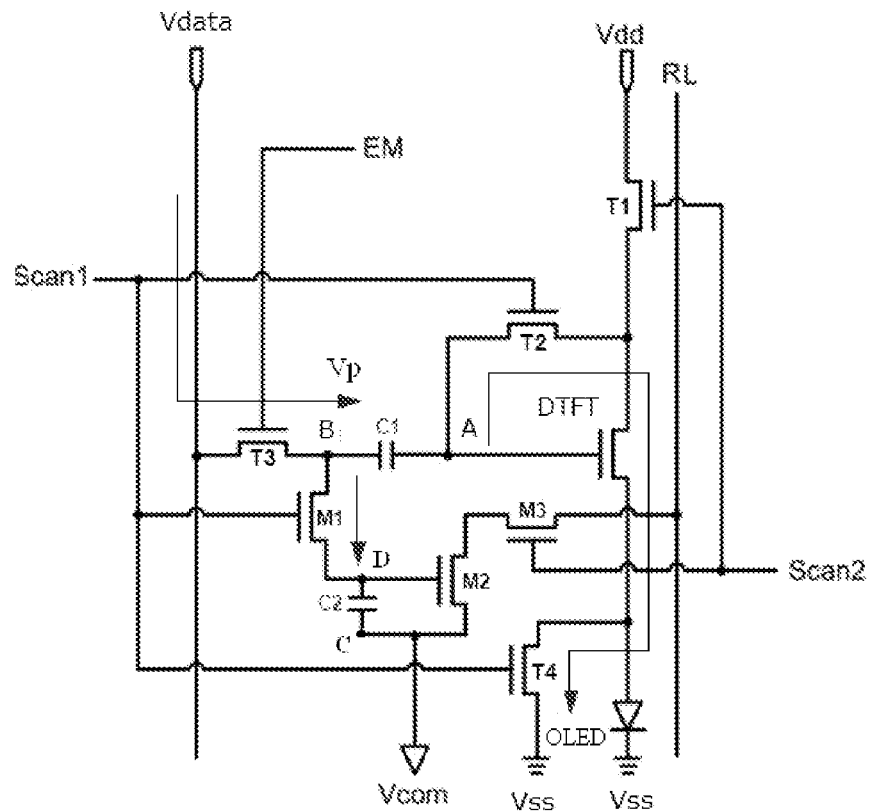

At the second stage of the time period, Scan1 and EM at both at a high level, Scan2 is at a low level, Vdata is at the resetting level Vp, T1 is turned off, and T2, T3 and T4 are turned on. As shown in FIG. 4B, C1 starts to be discharged until the potential at the end A reaches the threshold voltage Vth of the DTFT, the end B is configured to receive Vdata, and the potential at the end B is just the resetting level Vp.

At this time, M1 is turned on, M3 is turned off, and the potential at the gate electrode of M2 is reset to Vp.

Figure 4C:
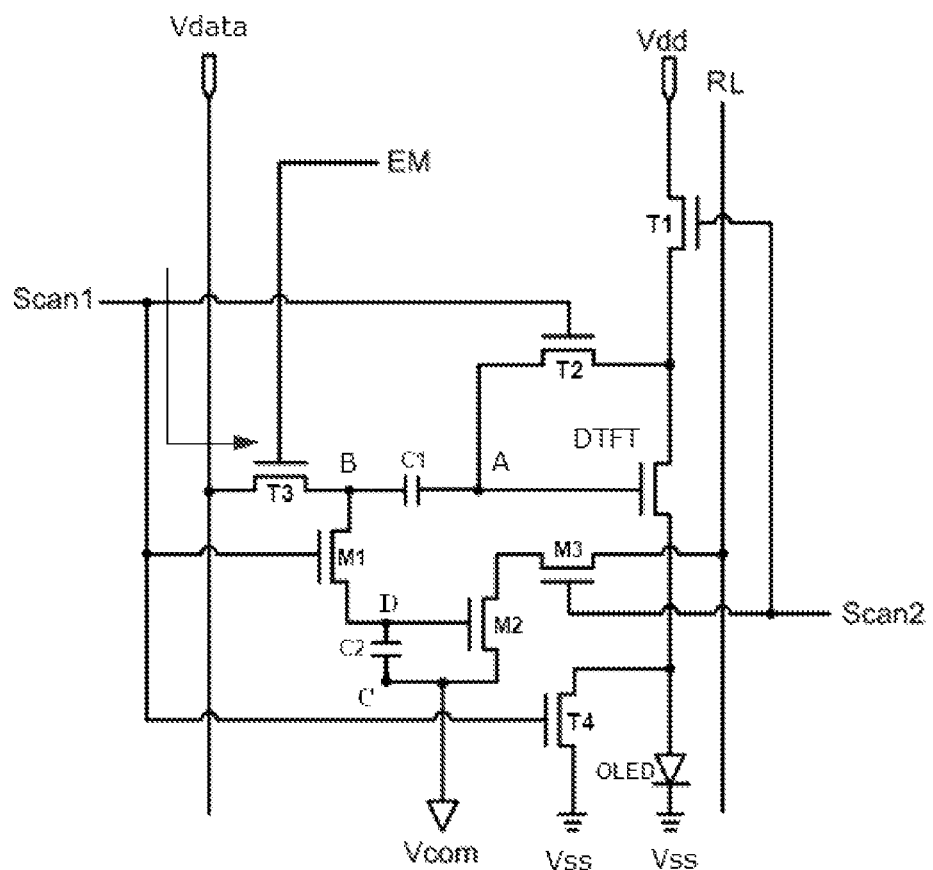

At the third stage of the time period, Scan1 and Scan2 are both at a low level, EM is at a high level, and Vdata jumps to Vp+ΔVdata (a variation of the data voltage). At this time, M1, M2 and M3 are turned off, and the touch controlling unit is at a stagnation stage. T1, T2 and T4 are turned off. As shown in FIG. 4C, T3 is turned on, the potential at the end B jumps from Vp to Vp+ΔVdata. At this time, the end A is in a floating state and a difference between a potential $V_A$ at the end A and a potential $V_B$ at the end B remains unchanged, so the potential at the end A jumps to, and is maintained at, Vth+ΔVdata.

Figure 4D:
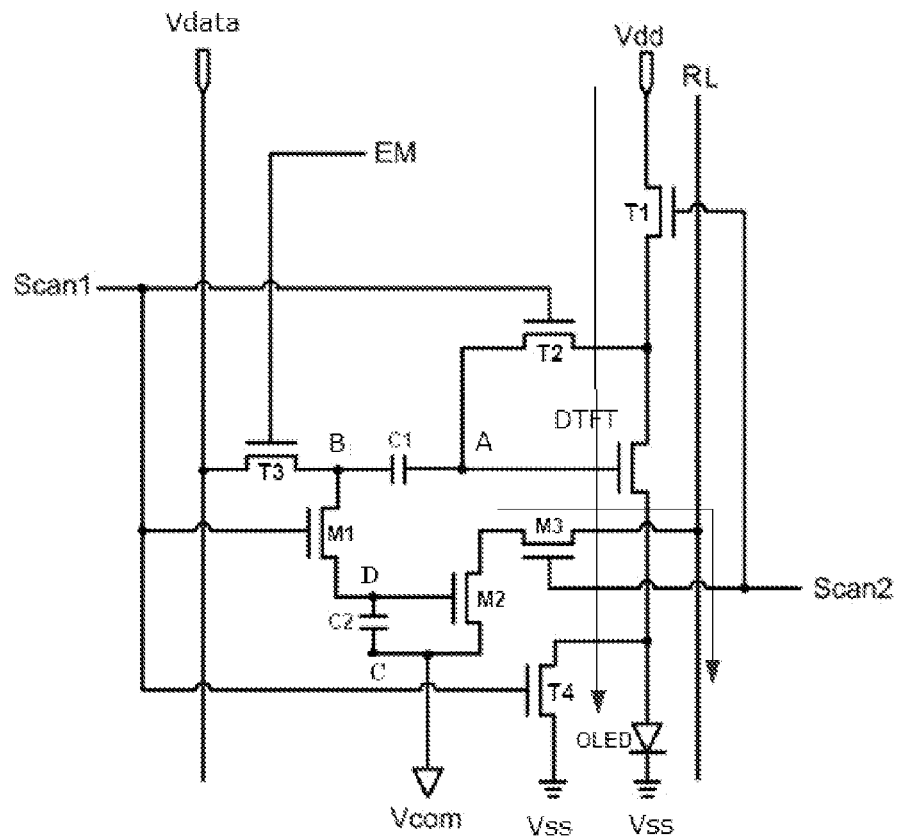

At the fourth stage of the time period, Scan1 and EM are both at a low level, Scan2 is at a high level, and Vdata is at a low level. As shown in FIG. 4D, in the driving controlling unit, T1 is turned on, T2, T3 and T4 are turned off, and the DTFT drives the OLED to emit light. At this time, merely T1 is turned on, so it is able to reduce the effect caused by the other TFTs on the light emission of the OLED. At this time, a current $I_{OLED}$ flowing through the OLED may be calculated by the equation:

$$\begin{aligned} I_{OLED} &= K(V_{GS} - V_{th})^2 \\ &= K[\Delta Vdata + Vth - Voled - Vth]^2 \\ &= K \times (\Delta Vdata - Voled)^2, \end{aligned}$$

wherein Voled is a potential at the anode of the OLED, $V_{GS}$ is a gate-to-source voltage of the DTFT, and K is a constant related to a manufacturing process and a driver design of the DTFT. As can be seen from the above equation, $I_{OLED}$ is not affected by Vth any more. As a result, it is able to completely prevent the threshold voltage drift of the DTFT due to the manufacturing process and a long-term operation, and to eliminate an effect caused by the threshold voltage Vth of the DTFT on $I_{OLED}$, thereby to ensure a normal operation of the OLED.

Figure 5:
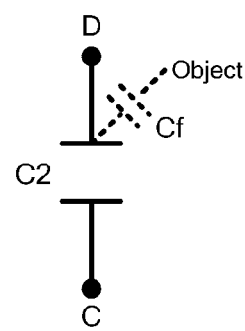
FIG. 5 is a schematic view showing a situation where capacitive touch control is achieved by the pixel circuit according to one embodiment of the present disclosure.
Figure 6:
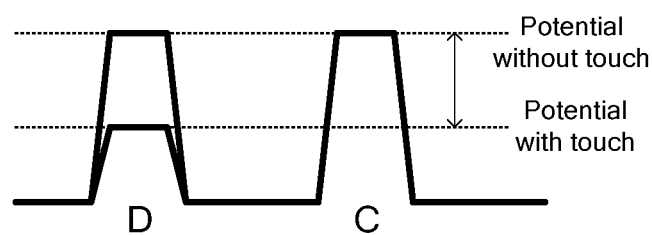
FIG. 6 is another schematic view showing a situation where the capacitive touch control is achieved by the pixel circuit according to one embodiment of the present disclosure.

In the touch controlling unit, M3 is turned on, and as shown in FIG. 5, the end of C2 other than the touch electrode end D is marked as end C. When an object (e.g., a finger or stylus) touches the touch electrode end D of C2, a coupling capacitance Cf may be generated between the object and the touch electrode end D, as shown in FIG. 6. At this time, the potential at the touch electrode D of C2 is decreased, but the gate-to-source voltage of M2 may still satisfy a condition for turning on the MOS transistor (which is closely related to a size of the touch electrode and the manufacturing process of M2), i.e., Vdata−Vf>Vth2 (a threshold voltage of M2). M2 is turned on, so a touch sensing current flows through M3 and is finally received by RL. The touch sensing current received by RL is slightly smaller than the touch sensing current generated when no touch is made.

When the touch sensing current from RL is collected by a processor, the processor may determine, based on RL, a longitudinal (Y-axis) coordinate of the position where a touch is made, and determine, based on the second scanning line, a horizontal (X-axis) coordinate of the position, thereby to determine information about the position where the touch is made on a touch screen.

In this embodiment, the driving controlling unit adopts a novel circuit compensation mode where Vdata jump occurs, so as to prevent the occurrence of uneven threshold voltage Vth of the driving transistor due to the manufacturing process and the long-term operation, and to prevent the current flowing through the OLED of each pixel point from being adversely affected by the threshold voltage Vth. As a result, it is able to ensure the image display evenness and ensure that the current flows through the OLED merely at a light-emitting stage, thereby to indirectly improve a service life of the OLED.

During the implementation the capacitive touch controlling units are periodically arranged at an active display region, and touch electrodes are provided so as to sense whether or not a touch is made. To be specific, a current signal is generated as a touch sensing signal in accordance with a change in the potential of the touch electrode due to a coupling capacitance between the object and the touch electrode, so as to determine whether or not a touch is made. Then, the signal is collected by the terminal so as to determine the coordinate of the position where the touch is made.

The present disclosure provides in one embodiment a method for driving the pixel circuit in FIG. 2, including:

a display driving step:
at a first stage of a time period, under the control of a first scanning signal and a second scanning signal, controlling, by the driving controlling unit, a first end of the first storage capacitor to be charged to a second level;
at a second stage of the time period, under the control of the first scanning level and the second scanning level, controlling, by the driving controlling unit, a potential at a second end of the first storage capacitor to be a resetting voltage Vp, and controlling the first storage capacitor to be discharged, so as to decrease a potential at the first end of the first storage capacitor to a threshold voltage Vth of the driving transistor;
at a third stage of the time period, under the control of the second scanning signal, driving, by the driving controlling unit, the first end of the first storage capacitor to be floating, and controlling the potential at the second end of the first storage capacitor to jump to Vp+ΔVdata, so as to maintain the potential at the first end of the first storage capacitor at Vth+ΔVdata, ΔVdata being a variation of a data voltage; and
at a fourth stage of the time period, under the control of the second scanning signal, controlling, by the driving controlling unit, a second electrode of the driving transistor to receive the second level, controlling the driving transistor to drive the OLED to emit light, and compensating for the threshold voltage of the driving transistor with a gate-to-source voltage of the driving transistor, and a touching step:
at the second stage of the time period, resetting, by the touch controlling unit, a potential at a touch electrode end of a second storage capacitor to the resetting level Vp; and
at the fourth stage of the time period, converting, by the touch controlling unit, the potential at the touch electrode end of the second storage capacitor into a current signal, and transmitting the current signal as a touch sensing signal to a touch signal reading line.

Figure 7:
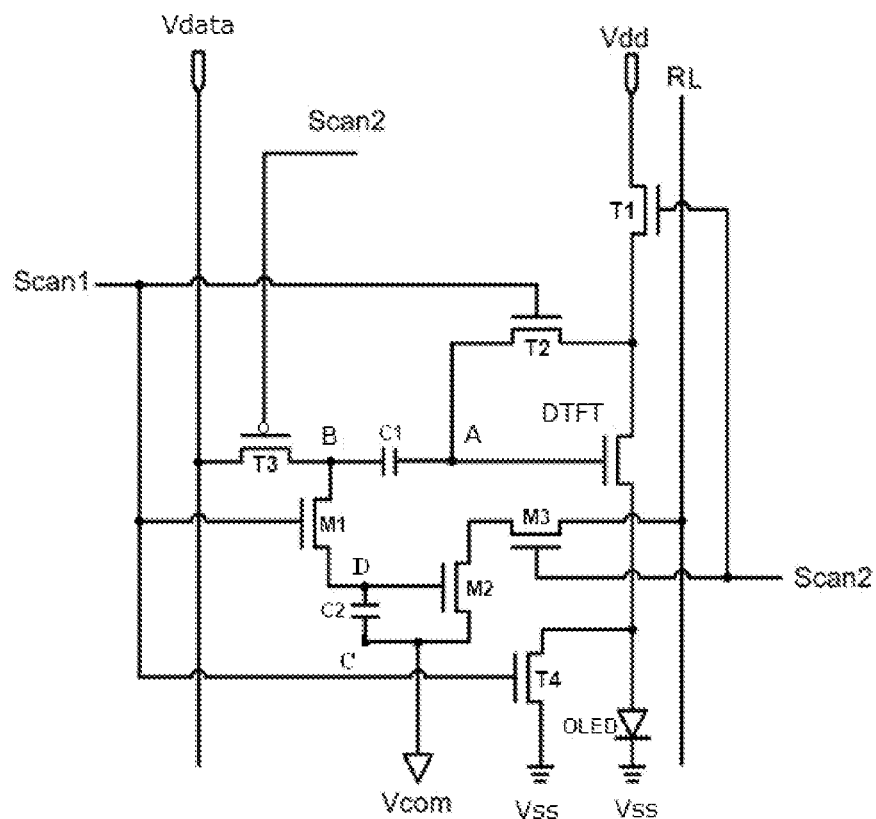
FIG. 7 is another circuit diagram of the pixel circuit according to one embodiment of the present disclosure.

During the actual operation, in an alternative embodiment, T3 in FIG. 2 may be a P-type TFT as shown in FIG. 7, and at this time, the gate electrode of T3 is configured to receive the second scanning signal Scan2.

Figure 8A:
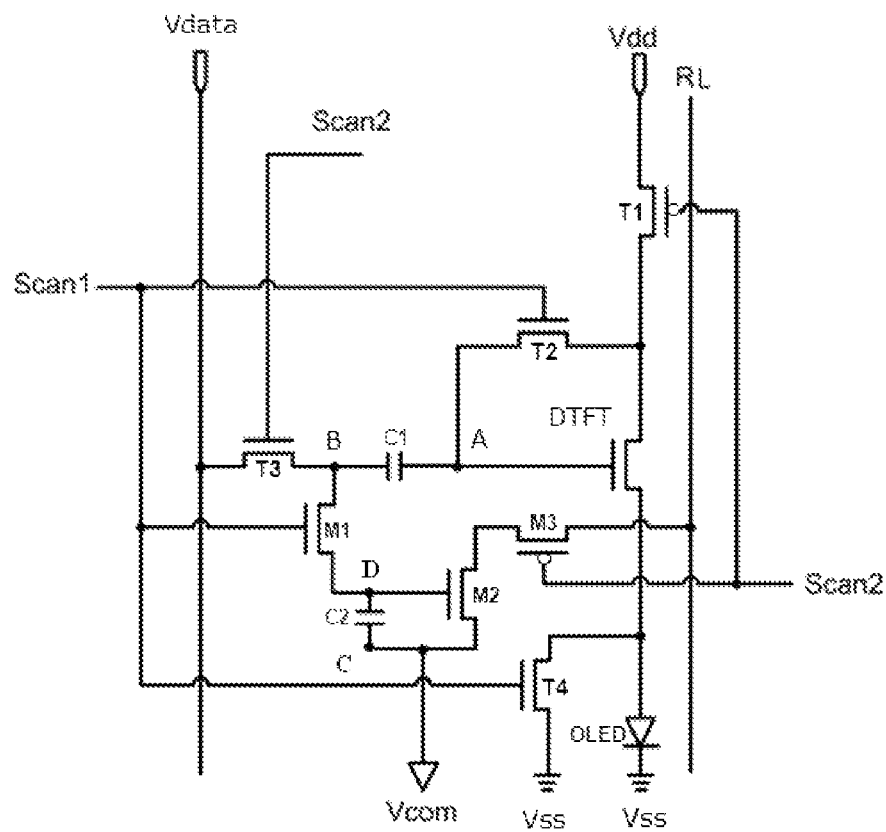
FIG. 8A is yet another circuit diagram of the pixel circuit according to one embodiment of the present disclosure.
Figure 8B:
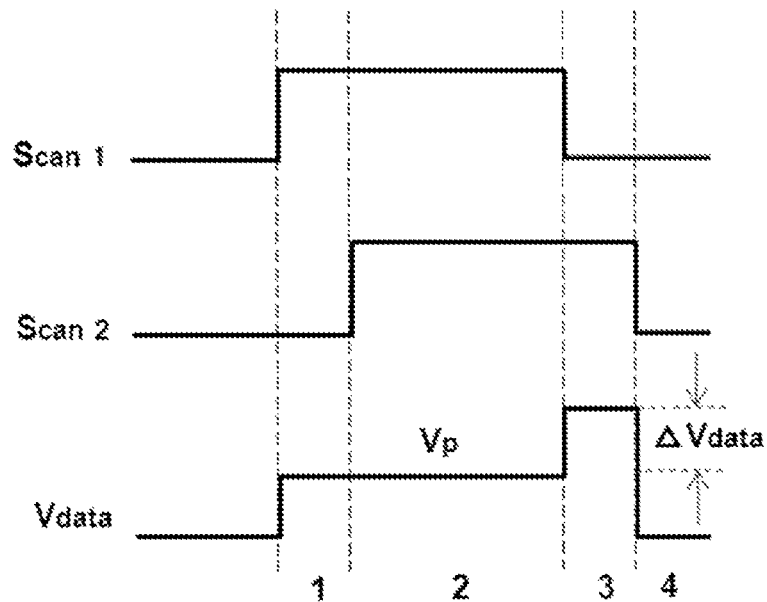
FIG. 8B is a sequence diagram of the pixel circuit in FIG. 8A.

In an alternative embodiment, T3 may also be an N-type TFT, and T1 and M3 may be P-type TFTs, as shown in FIG. 8A. At this time, the gate electrode of T3 is configured to receive the second scanning signal Scan 2 of a phase inverted to that of the original one (as shown in FIG. 8B).

To be specific, the pixel circuit in the embodiments of the present disclosure may be applied to a photosensitive, in-cell touch display panel, and the touch sensor includes a photosensitive transistor. The touch controlling unit is configured to convert a photocurrent signal generated by the photosensitive transistor into the touch sensing signal, and transmit the touch sensing signal to the touch signal reading line.

To be specific, the touch controlling unit includes:

a first touch controlling transistor, a gate electrode of which is configured to receive the first scanning signal, a first electrode of which is configured to receive the data voltage, and a second electrode of which is connected to a first electrode of the photosensitive transistor;

a second touch controlling transistor, a gate electrode of which is configured to receive the second scanning signal, a first electrode of which is connected to a second electrode of the photosensitive transistor, and a second electrode of which is connected to the touch signal reading line; and a second storage capacitor, a first electrode of which is connected to a gate electrode of the photosensitive transistor, and a second electrode of which is connected to the second electrode of the photosensitive transistor.

The gate electrode of the photosensitive transistor is connected to the first electrode of the photosensitive transistor. The second touch controlling transistor is of a type identical to the first driving controlling transistor, and the first touch controlling transistor is of a type identical to the second driving controlling transistor.

Figure 9:
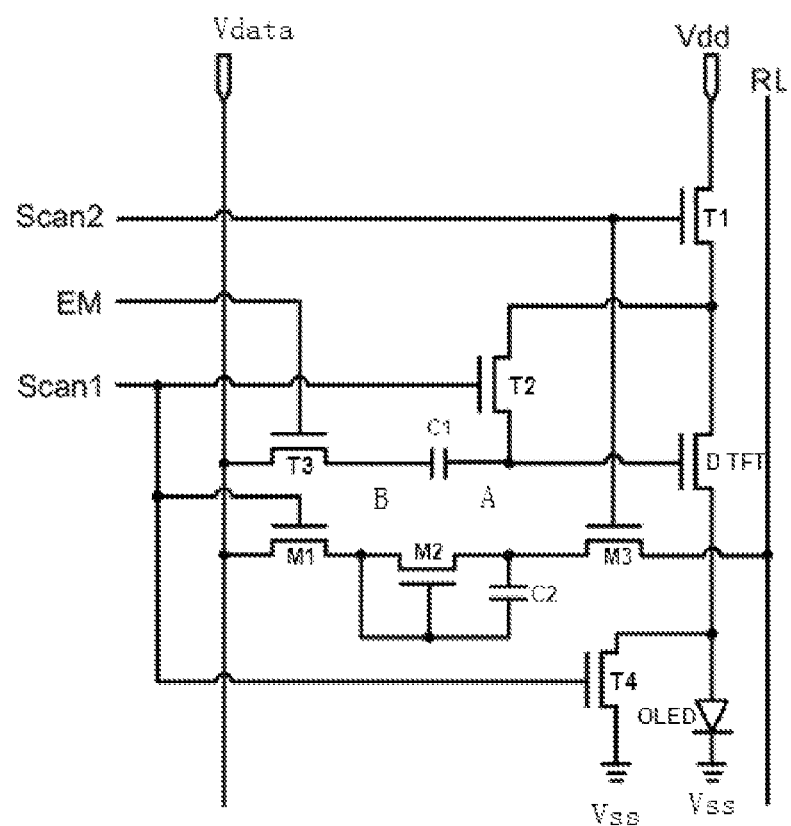
FIG. 9 is still yet another circuit diagram of the pixel circuit according to one embodiment of the present disclosure.

As shown in FIG. 9, in an alternative embodiment, the cathode of the OELD is configured to receive the first low level Vss. The driving controlling unit includes:

a first driving controlling transistor T1, a gate electrode of which is configured to receive the second scanning signal Scan2, a first electrode of which is connected to the second electrode of the driving transistor DTFT, and a second electrode of which is configured to receive the high level Vdd;

a second driving controlling transistor T2, a gate electrode of which is configured to receive the first scanning signal Scan1, a first electrode of which is connected to the first end A of the first storage capacitor C1, and a second electrode of which is connected to the second electrode of the driving transistor DTFT;

a third driving controlling transistor T3, a gate electrode of which is configured to receive the control signal EM, a first electrode of which is connected to the second end B of the first storage capacitor C1, and a second electrode of which is configured to receive the voltage data Vdata, the control signal EM being of a phase inverted to that of the second scanning signal Scan2; and a fourth driving controlling transistor T4, a gate electrode of which is configured to receive the first scanning signal Scan1, a first electrode of which is configured to receive the first low level Vss, and a second electrode of which is connected to the first electrode of the driving transistor DTFT.

In this embodiment, DTFT, T1, T2, T3 and T4 are all N-type TFTs, and the pixel design adopts a 5T1C-based compensating structure. As a result, it is able to use the same process for manufacturing an MOS FET, and to improve the product yield.

The touch controlling unit includes:

a photosensitive transistor M2;

a first touch controlling transistor M1, a gate electrode of which is configured to receive the first scanning signal Scan1, a first electrode of which is configured to receive the data voltage Vdata, and a second electrode of which is connected to the first electrode of the photosensitive transistor M2;

a second touch controlling transistor M3, a gate electrode of which is configured to receive the second scanning signal Scan2, a first electrode of which is connected to a second electrode of the photosensitive transistor M2, and a second electrode of which is connected to the touch signal reading line RL; and a second storage capacitor C2, a first end of which is connected to a gate electrode of the photosensitive transistor M2, and a second end of which is connected to the second electrode of the photosensitive transistor M2.

The gate electrode of the photosensitive transistor M2 is connected to the first electrode of the photosensitive transistor M2.

In the pixel circuit of this embodiment, M1, M2 and M3 are all N-type TFTs, and M2 is a photosensitive TFT. A photocurrent is generated when the photosensitive TFT is irradiated by light, and different light intensities lead to the photocurrents in different intensities. M1 and M3 are switching TFTs, C2 is used to store the photocurrent generated by M2. T1, T2, T3 and T4 are switching TFTs, and DTFT is a driving TFT.

A coordinate of a position where a touch is made is determined through a second scanning line outputting the second scanning line Scan2 and the touch signal reading line RL. In other words, an X-axis coordinate is determined through the second scanning line, and a Y-axis coordinate is determined through the touch signal reading line RL.

In this embodiment, the first scanning signal, the second scanning signal and the data voltage are multiplexed by the driving controlling unit and the touch controlling unit of the pixel circuit, so it is able to achieve integration of a display function and a touch function of the AMOLED in a more effective manner through three signal lines.

In this embodiment, the driving controlling unit adopts a novel circuit compensation mode where Vdata jump occurs, so as to prevent the occurrence of uneven threshold voltage Vth of the driving transistor due to the manufacturing process and the long-term operation, and to prevent the current flowing through the OLED of each pixel point from being adversely affected by the threshold voltage Vth. As a result, it is able to ensure the image display evenness and ensure that the current flows through the OLED merely at a light-emitting stage, thereby to indirectly improve a service life of the OLED.

Figure 10:
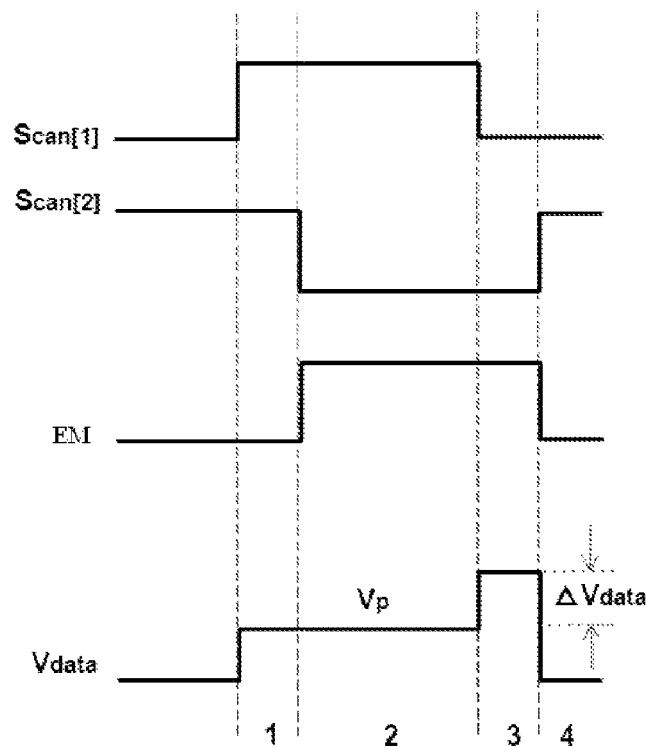
FIG. 10 is a sequence diagram of the first scanning signal Scan1, the second scanning signal Scan2, the control signal EM and the data voltage Vdata for the pixel circuit in FIG. 9.

FIG. 10 is a sequence diagram of the first scanning signal Scan1, the second scanning signal Scan2, the control signal EM and the data voltage Vdata for the pixel circuit in FIG. 9.

Figure 11A:
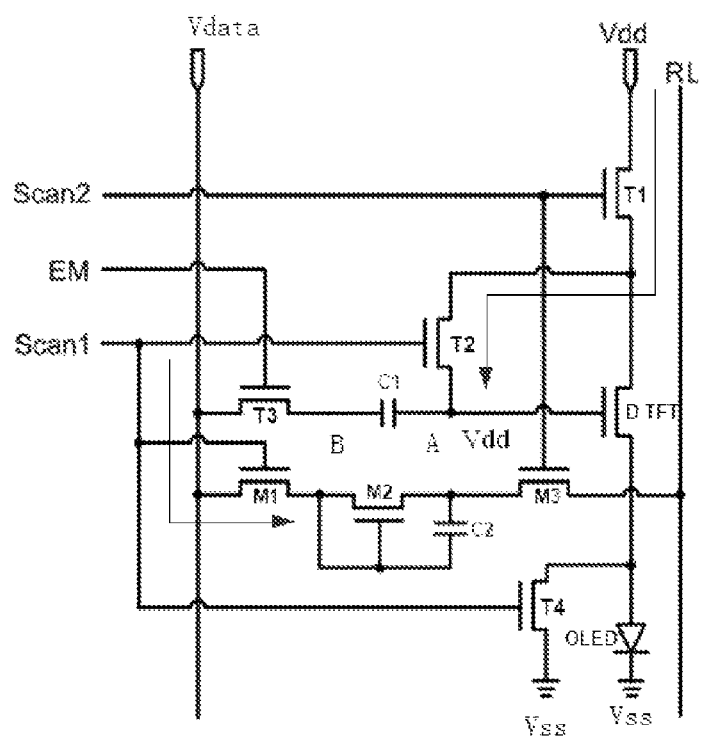
FIGS. 11A, 11B, 11C and 11D are schematic views showing the pixel circuit in FIG. 9 at the first stage, the second stage, the third stage and the fourth stage.

During the operation of the pixel circuit in FIG. 9, at the first stage of the time period, Scan1 and Scan2 are both at a high level, EM is at a low level, and Vdata is at the resetting level Vp. As shown in FIG. 11A, T1, T2 and T4 are turned on, and T3 is turned off, so as to charge the end A to be Vdd. M1, M2 and M3 are turned on, and RL receives an initial reference amplification signal.

Figure 11B:
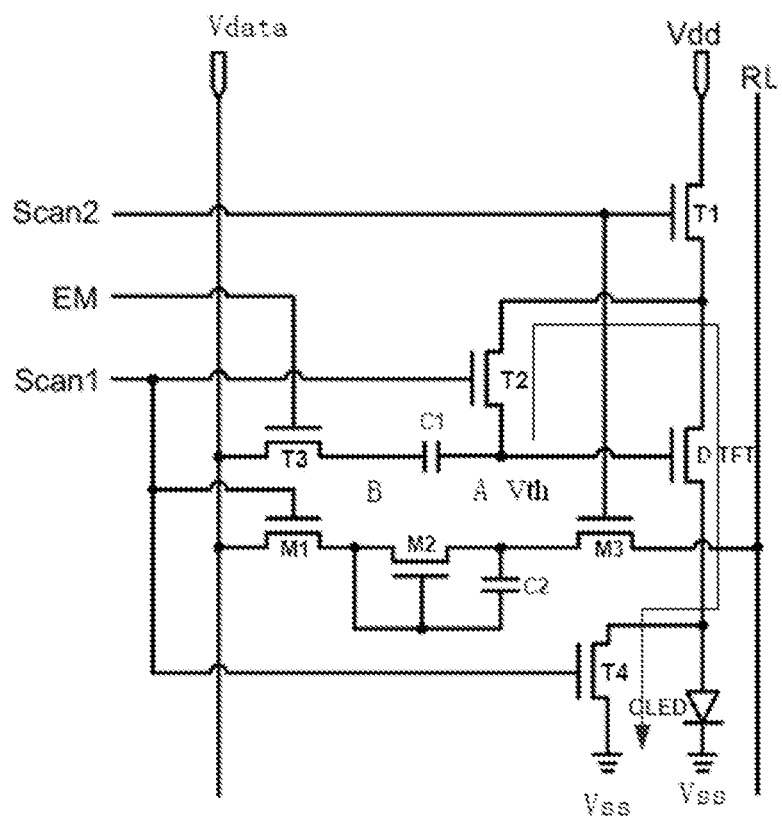

At the second stage of the time period, Scan1 and EM are both at a high level, Scan2 is at a low level, and Vdata is at the resetting level Vp. As shown in FIG. 11B, T1 is turned off, T2, T3 and T4 are turned on, C1 starts to be discharged until the potential at the end A reaches the threshold voltage Vth of the DTFT, the end B is configured to receive Vdata, and the potential at the end B is just the resetting level Vp.

At this time, M1 and M2 are turned on, M3 is turned off, and the potential at the gate electrode and the first electrode of M2 is reset to Vp.

Figure 11C:
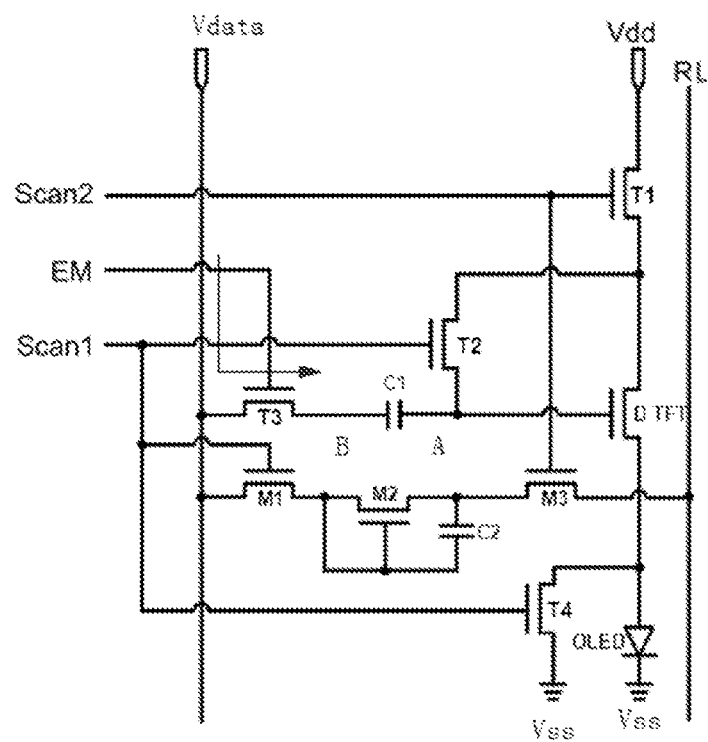

At the third stage of the time period, Scan1 and Scan2 are both at a low level, EM is at a high level, and Vdata jumps to Vp+ΔVdata (a variation of the data voltage). As shown in FIG. 11C, T1, T2 and T4 are turned off, T3 is turned on, the potential at the end B jumps from Vp to Vp+ΔVdata. At this time, the end A is in a floating state and a difference between a potential $V_A$ at the end A and a potential $V_B$ at the end B remains unchanged, so the potential at the end A jumps to, and is maintained at, Vth+ΔVdata. At this time, M1 and M3 are turned off, M2 (a photosensitive transistor) is turned on, and C2 stores the photocurrent generated by M2. The photocurrent generated when no touch is made is larger than that generated when a touch is made.

Figure 11D:
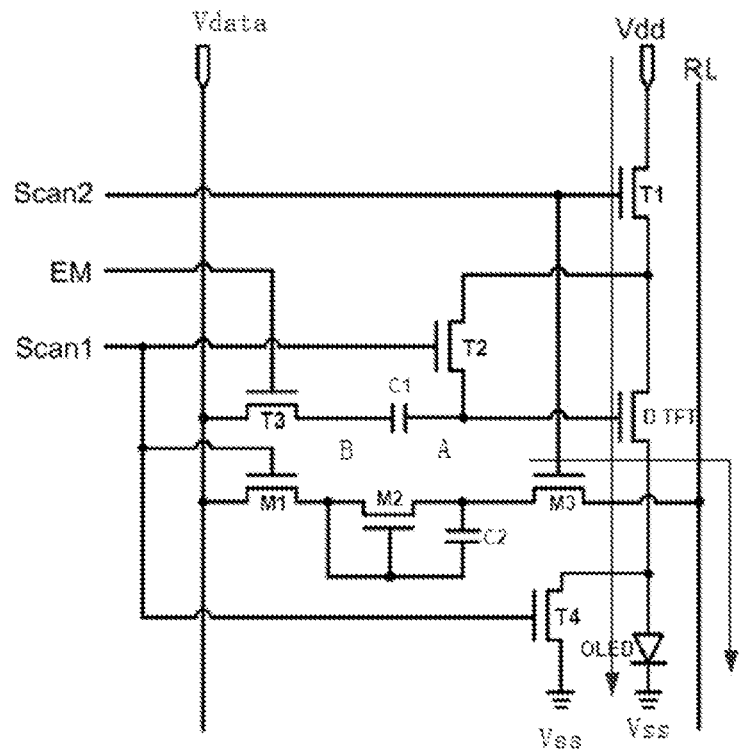

At the fourth stage of the time period, Scan1 and EM are at a low level, Scan2 is at a high level, and Vdata is at a low level. As shown in FIG. 11D, T1 is turned on, DTFT drives the OLED to emit light, and T2, T3 and T4 are turned off. At this time, merely T1 is turned on, so it is able to reduce an effect caused by the other TFTs on the OLED. At this time, a current $I_{OLED}$ flowing through the OLED may be calculated by the equation:

$$I_{OLED} = K(V_{GS} - V_{th})^2$$
$$= K[\Delta Vdata + Vth - Voled - Vth]^2$$
$$= K \cdot (\Delta Vdata - Voled)^2,$$

wherein Voled is a potential at the anode of the OLED, $V_{GS}$ is a gate-to-source voltage of the DTFT. As can be seen from the above equation, $I_{OLED}$ is not affected by Vth any more. As a result, it is able to completely prevent the threshold voltage drift of the DTFT due to the manufacturing process and a long-term operation, and to eliminate an effect caused by the threshold voltage Vth of the DTFT on $I_{OLED}$, thereby to ensure a normal operation of the OLED.

Due to the illumination at the previous stage, a photocurrent signal generated by M2 for charging C2 changes. At this time, the photocurrent signal is transmitted to an amplifier at an end of RL, and then the amplified photocurrent signal is transmitted to a processor for calculation and analysis. When a touch is made during this period, a difference between the intensities of the photocurrent signal before and after the touch is compared with a threshold obtained when no touch is made, so as to determine whether or not a touch is made. It is able to determine, based on RL, a longitudinal (Y-axis) coordinate of the position where a touch is made, and determine, based on the second scanning line, a horizontal (X-axis) coordinate of the position, thereby to determine information about the position where the touch is made on a touch screen.

Figure 12:
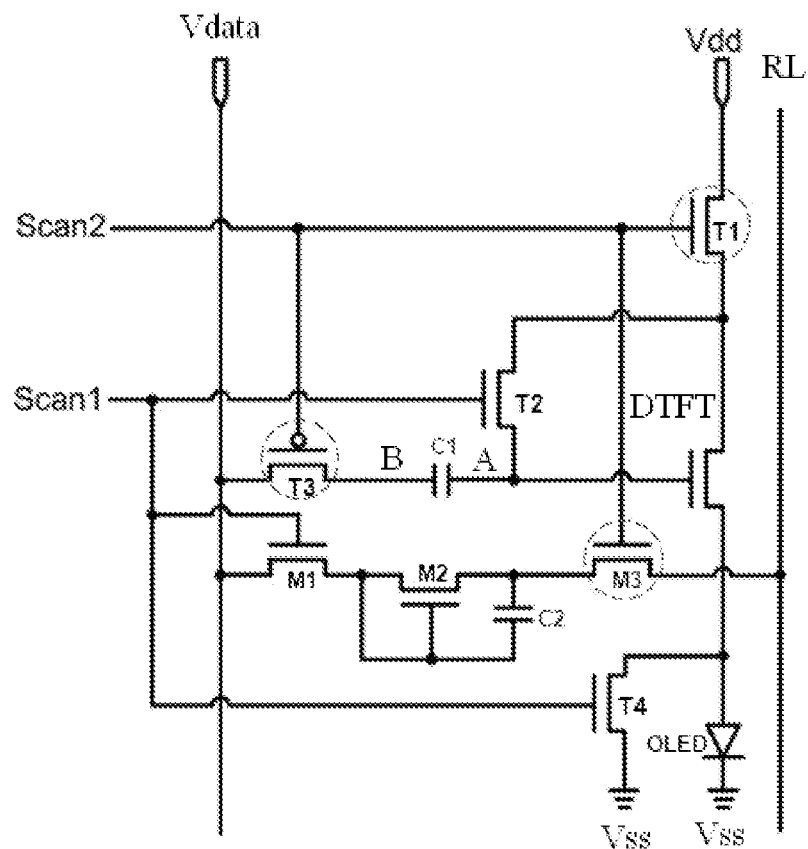
FIG. 12 is still yet another circuit diagram of the pixel circuit according to one embodiment of the present disclosure.

During the actual operation, in an alternative embodiment, T3 in FIG. 9 may be a P-type TFT, as shown in FIG. 12. At this time, the gate electrode of T3 is configured to receive the second scanning signal Scan2.

Figure 13A:
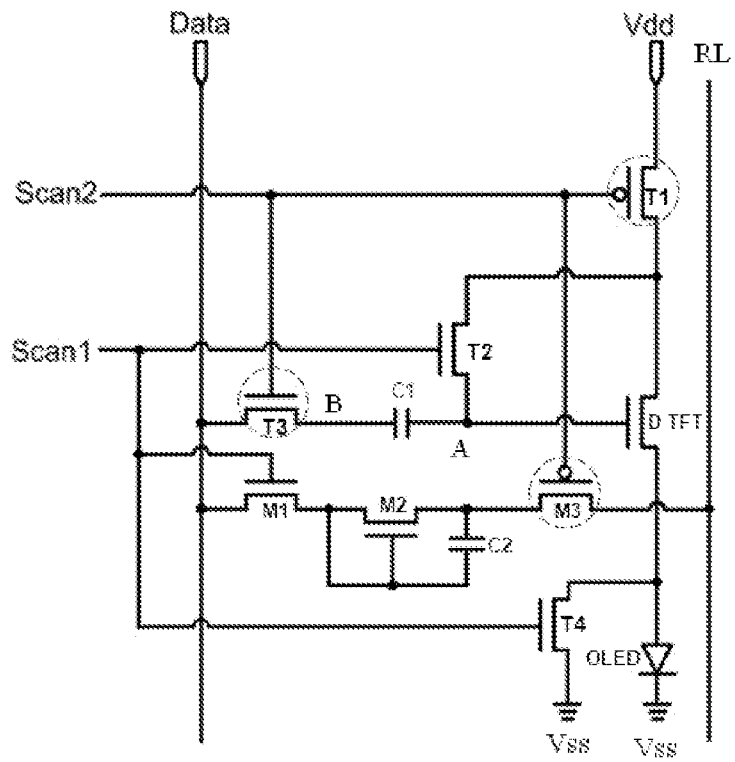
FIG. 13A is still yet another circuit diagram of the pixel circuit according to one embodiment of the present disclosure.
Figure 13B:
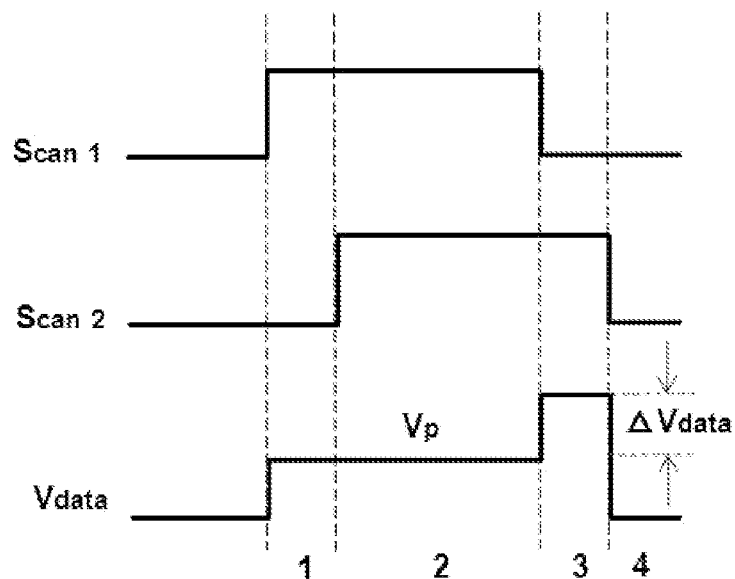
FIG. 13B is a sequence diagram of the pixel circuit in FIG. 13A.

In an alternative embodiment, T3 may also be an N-type TFT, and T1 and M3 may be P-type TFTs, as shown in FIG. 13A. At this time, the gate electrode of T3 is configured to receive the second scanning signal Scan2 of a phase inverted to that of the original one (as shown in FIG. 13B).

During the implementation, the photosensitive touch controlling units are periodically arranged at an active display region, and photosensitive transistors are designed to sense outsides photo signals. According to the change of light intensity sensed by the photosensitive transistor, a difference between the intensities of the photo current signals before and after the touch is compared with an original one so as to determine whether a touch is made. Then, the signal is collected by the terminal so as to determine the coordinate of the position where the touch is made. In addition, a module manufactured using the photosensitive touch principle is not constrained by a size of a display device, so it has been widely used in a large-scale display device.

The present disclosure provides in one embodiment a method for driving the pixel circuit in FIG. 9, including:

a display driving step:

at a first stage of a time period, under the control of a first scanning signal and a second scanning signal, controlling, by the driving controlling unit, a first end of the first storage capacitor to be charged to a second level;

at a second stage of the time period, under the control of the first scanning signal and the second scanning signal, controlling, by the driving controlling unit, a potential at a second end of the first storage capacitor to be a resetting voltage Vp, and controlling the first storage capacitor to be discharged, so as to decrease a potential at the first end of the first storage capacitor to a threshold voltage Vth of the driving transistor;

at a third stage of the time period, under the control of the second scanning signal, controlling, by the driving controlling unit, the first end of the first storage capacitor to be floating, and controlling the potential at the second end of the first storage capacitor to jump to Vp+ΔVdata, so as to maintain the potential at the first end of the first storage capacitor at Vth+Vdata, ΔVdata being a variation of a data voltage; and at a fourth stage of the time period, under the control of the second scanning signal, controlling, by the driving controlling unit, a second electrode of the driving transistor to receive the second level, controlling the driving transistor to drive an OLED to emit light, and compensating for the threshold voltage of the driving transistor with a gate-to-source voltage of the driving transistor, and a touching step:

at the first stage of the time period, under the control of the first scanning signal and the second scanning signal, writing, by the touch controlling unit, the resetting level Vp into a touch signal reading line;

at the second stage of the time period, under the control of the first scanning signal and the second scanning signal, resetting, by the touch controlling unit, a potential at a first electrode of the photosensitive transistor to the resetting level Vp;

at the third stage of the time period, under the control of the second scanning signal, controlling, by the touch controlling unit, a second storage capacitor to be charged with a photocurrent signal generated by the photosensitive transistor as a charging current; and at the fourth stage of the time period, under the control of the second scanning signal, converting, by the touch controlling unit, a potential at a second end of the second storage capacitor into a current signal, and transmitting the current signal as a touch sensing signal to the touch signal reading line.

The present disclosure further provides in one embodiment an OLED display panel including the above-mentioned pixel circuit.

The present disclosure further provides in one embodiment a display device including the above-mentioned OLED display panel. Alternatively, the display device may be an AMOLED display device. As a next-generation display technology, it is unnecessary for the AMOLED display technology to use liquid crystals as a medium for grayscale display, so there exists no such problem that the display is adversely affected by the touch.

The pixel circuit, the OLED display panel and the display device in the embodiments of the present disclosure may adopt a low-temperature polysilicon (LTPS) process, and due to such a design with multiple TCs (multiple transistors and capacitors), an aperture ratio of the module will not be adversely affected.

Alternatively, the pixel circuit, the OLED display panel and the display device in the embodiments of the present disclosure may also adopt an a-Si process.

It should be appreciated that, the pixel circuit in the embodiments of the present disclosure may be applicable to the thin film transistors manufactured by a-Si, poly-Si or oxide. The types of the transistors used in the pixel circuit may be determined in accordance with the practical need. In addition, although the description is given hereinabove by taking the AMOLED display device as an example, the present disclosure is not limited thereto, and it may also be applicable to other LED display devices.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A pixel circuit comprising:
  a driving transistor;
  a first storage capacitor;
  an organic light-emitting diode (OLED),
    wherein a gate electrode of the driving transistor is connected to a first end of the first storage capacitor,
    wherein a first electrode of the driving transistor is connected to an anode of the OLED, and
    wherein a cathode of the OLED is configured to receive a first voltage;
  a driving controlling circuit connected to the first end of the first storage capacitor, a second end of the first storage capacitor, the first electrode of the driving transistor and a second electrode of the driving transistor, wherein the driving controlling circuit is configured to, based on a first scanning signal and a second scanning signal, charge or discharge the first storage capacitor based on the first voltage, a second voltage and a data voltage to compensate for a threshold voltage of the driving transistor with a gate-to-source voltage of the driving transistor when the OLED is driven by the driving transistor to emit light; and
  a touch controlling circuit directly connected to the second end of the first storage capacitor and a touch signal reading line, wherein the touch controlling circuit includes a touch sensor and is configured to, based on the first scanning signal and the second scanning signal, sense via the touch sensor whether or not a touch has been detected by the touch sensor and transmit a corresponding touch sensing signal to the touch signal reading line.

2. The pixel circuit according to claim 1, wherein the driving controlling circuit comprises:
  a first driving controlling transistor comprising
    a gate electrode configured to receive the second scanning signal,
    a first electrode connected to the second electrode of the driving transistor, and
    a second electrode configured to receive the second voltage;
  a second driving controlling transistor comprising
    a gate electrode configured to receive the first scanning signal,
    a first electrode connected to the first end of the first storage capacitor, and
    a second electrode connected to the second electrode of the driving transistor;
  a third driving controlling transistor comprising
    a gate electrode configured to receive a control signal,
    a first electrode connected to the second end of the first storage capacitor, and
    a second electrode connected to the data voltage, the control signal being of a phase inverted to that of the second scanning signal; and
  a fourth driving controlling transistor comprising
    a gate electrode configured to receive the first scanning signal,
    a first electrode configured to receive the first voltage, and
    a second electrode connected to the first electrode of the driving transistor,
  wherein the first driving controlling transistor is of a type identical to the third driving controlling transistor, and
  wherein the second driving controlling transistor is of a type identical to the fourth driving controlling transistor.

3. The pixel circuit according to claim 2, wherein:
  the touch sensor comprises a touch electrode; and
  the touch controlling circuit is configured to convert a potential of the touch electrode into the touch sensing signal and transmit the touch sensing signal to the touch signal reading line.

4. The pixel circuit according to claim 2, wherein:
  the touch sensor comprises a photosensitive transistor; and
  the touch controlling circuit is configured to convert a photocurrent signal generated by the photosensitive transistor to the touch sensing signal and transmit the touch sensing signal to the touch signal reading line.

5. The pixel circuit according to claim 1, wherein the driving controlling circuit comprises:
  a first driving controlling transistor comprising
    a gate electrode configured to receive the second scanning signal,
    a first electrode connected to the second electrode of the driving transistor, and
    a second electrode configured to receive the second voltage;
  a second driving controlling transistor comprising
    a gate electrode configured to receive the first scanning signal,
    a first electrode connected to the first end of the first storage capacitor, and
    a second electrode connected to the second electrode of the driving transistor;
  a third driving controlling transistor comprising
    a gate electrode connected to the second scanning signal,
    a first electrode connected to the second end of the first storage capacitor, and a second electrode configured to receive the data voltage; and
a fourth driving controlling transistor comprising
a gate electrode configured to receive the first scanning signal,
a first electrode configured to receive the first voltage, and
a second electrode connected to the first electrode of the driving transistor,
wherein the first driving controlling transistor is of a type different from the third driving controlling transistor, and
wherein the second driving controlling transistor is of a type identical to the fourth driving controlling transistor.

6. The pixel circuit according to claim 5, wherein;
the touch sensor comprises a touch electrode; and
the touch controlling circuit is configured to convert a potential of the touch electrode into the touch sensing signal and transmit the touch sensing signal to the touch signal reading line.

7. The pixel circuit according to claim 5, wherein:
the touch sensor comprises a photosensitive transistor; and
the touch controlling unit circuit is configured to convert a photocurrent signal generated by the photosensitive transistor to the touch sensing signal and transmit the touch sensing signal to the touch signal reading line.

8. The pixel circuit according to claim 1, wherein,
the touch sensor comprises a touch electrode, and
the touch controlling circuit is configured to convert a potential of the touch electrode into the touch sensing signal and transmit the touch sensing signal to the touch signal reading line.

9. The pixel circuit according to claim 8, wherein the touch controlling circuit comprises:
a second storage capacitor;
a first touch controlling transistor comprising
a gate electrode configured to receive the first scanning signal,
a first electrode connected to a touch electrode end of the second storage capacitor, and
a second electrode connected to the second end of the first storage capacitor;
a second touch controlling transistor comprising
a gate electrode connected to the touch electrode end of the second storage capacitor, and
a first electrode configured to receive a third level; and
a third touch controlling transistor comprising
a gate electrode configured to receive the second scanning signal,
a first electrode connected to a second electrode of the second touch controlling transistor, and
a second electrode connected to the touch signal reading line,
wherein
another end of the second storage capacitor is configured to receive the third level,
the third touch controlling transistor is of a type identical to the first driving controlling transistor, and
the first touch controlling transistor is of a type identical to the second driving controlling transistor.

10. A method for driving the pixel circuit of claim 3, the method comprising:
a display driving operation including
at a first stage of a time period and based on the first scanning signal and the second scanning signal,
controlling, via the driving controlling circuit, charging of the first end of the first storage capacitor to the second voltage,
at a second stage of the time period and based on the first scanning signal and the second scanning signal,
controlling, via the driving controlling circuit, a potential at the second end of the first storage capacitor to be a resetting voltage Vp, and
controlling discharging of the first storage capacitor to decrease a potential at the first end of the first storage capacitor to a threshold voltage Vth of the driving transistor,
at a third stage of the time period, and based on the second scanning signal,
driving, via the driving controlling circuit, the first end of the first storage capacitor to be floating, and
controlling the potential at the second end of the first storage capacitor to jump to Vp+ΔVdata to maintain the potential at the first end of the first storage capacitor at Vth+ΔVdata, where ΔVdata is a variation of a data voltage, and
at a fourth stage of the time period based on the second scanning signal,
controlling, via the driving controlling circuit, whether the second electrode of the driving transistor receives the second voltage,
controlling the driving transistor to drive the OLED to emit light, and
compensating for the threshold voltage of the driving transistor with the gate-to-source voltage of the driving transistor; and
a touching operation comprising
at the second stage of the time period, resetting, via the touch controlling circuit, a potential at the touch electrode end of the second storage capacitor to the resetting level Vp, and
at the fourth stage of the time period,
converting, via the touch controlling circuit, the potential at the touch electrode end of the second storage capacitor to a current signal, and
transmitting the current signal as the touch sensing signal to the touch signal reading line.

11. The pixel circuit according to claim 1, wherein
the touch sensor comprises a photosensitive transistor; and
the touch controlling circuit is configured to convert a photocurrent signal generated by the photosensitive transistor into the touch sensing signal and transmit the touch sensing signal to the touch signal reading line.

12. A method for driving the pixel circuit of claim 1, the method comprising:
performing a display driving operation within a time period based on the first scanning signal and the second scanning signal, wherein the display driving operation includes enabling, via the driving controlling circuit, the first storage capacitor to be charged or discharged based on the first voltage, the second voltage and the data voltage to compensate for the threshold voltage of the driving transistor with a gate-to-source voltage of the driving transistor when the OLED is driven by the driving transistor to emit light; and
performing a touching operation within the time period based on the first scanning signal and the second scanning signal, wherein the touching operation includes sensing, via the touch controlling circuit, whether or not a touch has been detected by the touch sensor and transmitting the touch sensing signal to the touch signal reading line.

13. The method according to claim 12, wherein the display driving operation comprises:
   at a first stage of the time period and based on the first scanning signal and the second scanning signal, controlling, via the driving controlling circuit, charging of a first end of the first storage capacitor to the second voltage;
   at a second stage of the time period and based on the first scanning signal and the second scanning signal,
      controlling, via the driving controlling circuit, adjustment of a potential at a second end of the first storage capacitor to a resetting voltage Vp and
      controlling discharging of the first storage capacitor to decrease a potential at the first end of the first storage capacitor to a threshold voltage Vth of the driving transistor;
   at a third stage of the time period and based on the second scanning signal,
      controlling, via the driving controlling circuit, whether the first end of the first storage capacitor is floating, and
      controlling a potential at the second end of the first storage capacitor to jump to Vp+ΔVdata to maintain the potential at the first end of the first storage capacitor at Vth+ΔVdata, where ΔVdata is a variation of the data voltage; and
   at a fourth stage of the time period and based on the second scanning signal,
      controlling, via driving controlling circuit, whether a second electrode of the driving transistor receives the second voltage,
      controlling the driving transistor to drive the OLED to emit light, and
      compensating for the threshold voltage of the driving transistor with the gate-to-source voltage of the driving transistor.

14. An organic light-emitting diode (OLED) display panel comprising the pixel circuit according to claim 1.

15. A display device comprising the OLED display panel according to claim 14.

* * * * *